US012811052B2

(12) United States Patent
Huang

(10) Patent No.: US 12,811,052 B2
(45) Date of Patent: Nov. 24, 2026

(54) PLANAR TRANSFORMER INCLUDING NOISE CANCELLATION FOR AUXILIARY WINDING

(71) Applicant: Navitas Semiconductor Limited, Dublin (IE)

(72) Inventor: Xiucheng Huang, Torrance, CA (US)

(73) Assignee: Navitas Semiconductor Limited, Dublin (IE)

( * ) Notice: Subject to any disclaimer, the term of this patent is extended or adjusted under 35 U.S.C. 154(b) by 1224 days.

(21) Appl. No.: 17/666,382

(22) Filed: Feb. 7, 2022

(65) Prior Publication Data

US 2023/0162905 A1 May 25, 2023

Related U.S. Application Data

(60) Provisional application No. 63/147,005, filed on Feb. 8, 2021.

(51) Int. Cl.
*H01F 27/28* (2006.01)
*H01F 27/38* (2006.01)

(52) U.S. Cl.
CPC ....... *H01F 27/289* (2013.01); *H01F 27/2804* (2013.01); *H01F 27/2885* (2013.01); *H01F 27/38* (2013.01); *H01F 2027/2809* (2013.01); *H01F 2027/2819* (2013.01)

(58) Field of Classification Search
CPC ......... H01F 27/2804; H01F 2027/2809; H01F 17/0006; H01F 17/0013; H01F 5/003; H01F 2027/2819; H01F 2017/008; H01F 27/288; H01F 27/2885; H01F 27/2871; H01F 27/36; H01F 27/289; H01F 27/345; H01F 27/38
USPC .................................................. 336/200, 232
See application file for complete search history.

(56) References Cited

U.S. PATENT DOCUMENTS

| | | | |
|---|---|---|---|
| 8,044,754 B2 | 10/2011 | Ouyang et al. | |
| 8,089,331 B2 | 1/2012 | Jacobson et al. | |
| 9,129,736 B2 | 9/2015 | Zhou et al. | |
| 9,748,036 B2 | 8/2017 | Zuo et al. | |
| 10,128,760 B2 | 11/2018 | Song et al. | |
| 2003/0132825 A1 * | 7/2003 | Gamou | H01F 27/2804 336/223 |

(Continued)

FOREIGN PATENT DOCUMENTS

| | | | |
|---|---|---|---|
| CN | 208315366 U | 1/2019 | |
| CN | 110310815 A * | 10/2019 | H02M 1/44 |

(Continued)

OTHER PUBLICATIONS

Office Action issued in CN202210118356X, dated Dec. 27, 2024, 14 pages.

*Primary Examiner* — Tszfung J Chan
(74) *Attorney, Agent, or Firm* — FisherBroyles, LLP

(57) ABSTRACT

An electronic transformer includes a magnetic core and first and second primary windings formed around the magnetic core. First and second secondary windings are also formed around the magnetic core and are shielded from the first and second primary windings by first and second shield windings. An auxiliary winding provides auxiliary power and is positioned on a same layer as the first shield winding. A compensation winding compensates for current imbalance in the transformer caused by the auxiliary winding and is positioned on a same layer as at least one of the first and the second shield windings.

19 Claims, 14 Drawing Sheets

(56) References Cited

U.S. PATENT DOCUMENTS

| | | | | |
|---|---|---|---|---|
| 2018/0166205 | A1 | 6/2018 | Whittle | |
| 2018/0174737 | A1 | 6/2018 | Song et al. | |
| 2021/0366647 | A1* | 11/2021 | Fei | H01F 27/38 |
| 2022/0102057 | A1 | 3/2022 | Yu | |
| 2022/0216001 | A1* | 7/2022 | Xiao | H01F 27/38 |
| 2022/0223333 | A1* | 7/2022 | Xiao | H02M 3/335 |

FOREIGN PATENT DOCUMENTS

| | | | | |
|---|---|---|---|---|
| CN | 110556240 | A1 | 12/2019 | |
| CN | 110911126 | A | 3/2020 | |
| CN | 111312489 | A * | 6/2020 | H01F 27/38 |
| EP | 3576113 | A1 * | 12/2019 | H01F 27/289 |
| EP | 3576114 | A1 | 12/2019 | |
| JP | 2012134291 | A | 7/2012 | |
| JP | 2013168553 | A | 8/2013 | |
| KR | 20140123255 | A | 10/2014 | |
| WO | 2020033325 | A1 | 2/2020 | |

* cited by examiner

PLANAR TRANSFORMER INCLUDING NOISE CANCELLATION FOR AUXILIARY WINDING

CROSS-REFERENCE TO RELATED APPLICATIONS

The present application claims priority to U.S. provisional patent application No. 63/147,005 filed on Feb. 8, 2021, entitled "PLANAR TRANSFORMER INCLUDING NOISE CANCELLATION FOR AUXILIARY WINDING," the entire contents of which is hereby incorporated by reference in its entirety for all purposes.

BACKGROUND

Electronic devices are often supplied power from an electrically isolated source to protect the electronic devices from shorts, overloads and other external conditions. Transformers are often used to provide the electrical isolation between the power input (also called a primary winding) and the power output (often called a secondary winding) that supplies power to the electronic devices. Transformers can also be used to change the output voltage relative to the input voltage and to provide one or more auxiliary power supply rails that power auxiliary electronic devices. The auxiliary power supply rails often draw power from the transformer and in doing so can induce a current imbalance between the primary winding and the secondary winding, resulting in the injection of common-mode noise into the system. New transformers are needed that can generate one or more auxiliary power supply rails without injecting common-mode noise into the system.

SUMMARY

Numerous benefits are achieved by way of the present invention over conventional techniques. For example, embodiments of the present invention provide the ability to generate one or more auxiliary voltages from a transformer without generating noise in the system. These and other embodiments of the invention along with many of its advantages and features are described in more detail in conjunction with the text below and attached figures.

In some embodiments an electronic component comprises a magnetic core and first and second primary windings formed around the magnetic core. First and second secondary windings and first and second shield windings are also formed around the magnetic core. An auxiliary winding is formed around the magnetic core and is positioned on a same layer as the first shield winding. A compensation winding is formed around the magnetic core and is positioned on a same layer as at least one of the first and the second shield windings.

In some embodiments the compensation winding is formed a same layer as the first shield winding. In various embodiments the compensation winding is formed around the magnetic core in an opposite direction as the first shield winding. In some embodiments the compensation winding is formed on a same layer as the second shield winding. In various embodiments the compensation winding is formed in an opposite direction as the second shield winding. In some embodiments a first end of the compensation winding is electrically coupled to the at least one of the first and second shield windings and a second end is electrically floating.

In some embodiments a transformer comprises a first layer including a first secondary winding and a second layer including a first shield winding and a compensation winding. The transformer can also comprise a third layer including a first primary winding and a fourth layer including a second primary winding, as well as a fifth layer including a second shield winding and an auxiliary winding. A sixth layer includes a second secondary winding.

In various embodiments the transformer further comprises a magnetic core wherein the first secondary winding, the first shield winding, the compensation winding, the first primary winding the second primary winding the second shield winding, the auxiliary winding and the second secondary winding are formed at least partially around the magnetic core. In some embodiments the compensation winding is formed in an opposite direction as compared to the first shield winding. In various embodiments a first end of the compensation winding is electrically coupled to the first shield winding and a second end is electrically floating. In some embodiments the auxiliary winding is a primary auxiliary winding. In various embodiments the auxiliary winding induces a current imbalance between the second primary winding and the second secondary winding, and wherein the compensation winding at least partially cancels the current imbalance.

In some embodiments a transformer comprises a magnetic core, at least one primary winding formed around the magnetic core and at least one secondary winding formed around the magnetic core. At least one shield winding is formed around the magnetic core and is positioned between the at least one primary winding and the at least one secondary winding. At least one auxiliary power winding is formed around the magnetic core and is positioned on a same layer as the at least one shield winding. At least one compensation winding is formed around the magnetic core and is arranged to cancel a current imbalance in the transformer generated by the at least one auxiliary winding.

In some embodiments the at least one compensation winding is formed on a same layer as the at least one shield winding. In various embodiments the at least one compensation winding is formed around the magnetic core in an opposite direction as compared to the at least one shield winding. In some embodiments a first end of the compensation winding is electrically coupled to the at least one shield winding and a second end is electrically floating. In various embodiments the at least one shield winding is a first shield winding and the at least one auxiliary power winding is formed on a same layer as the first shield winding, and wherein the transformer includes a second shield winding on a different layer than the first shield winding.

In some embodiments the at least one compensation winding is positioned on a same layer as the second shield winding. In various embodiments the at least one compensation winding is positioned on a same layer as the at least one shield winding and the at least one auxiliary winding. In some embodiments the auxiliary power winding induces a current imbalance between the at least one primary winding and the at least one secondary winding, and wherein the at least one compensation winding at least partially cancels the induced current imbalance.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION

Figure 1:
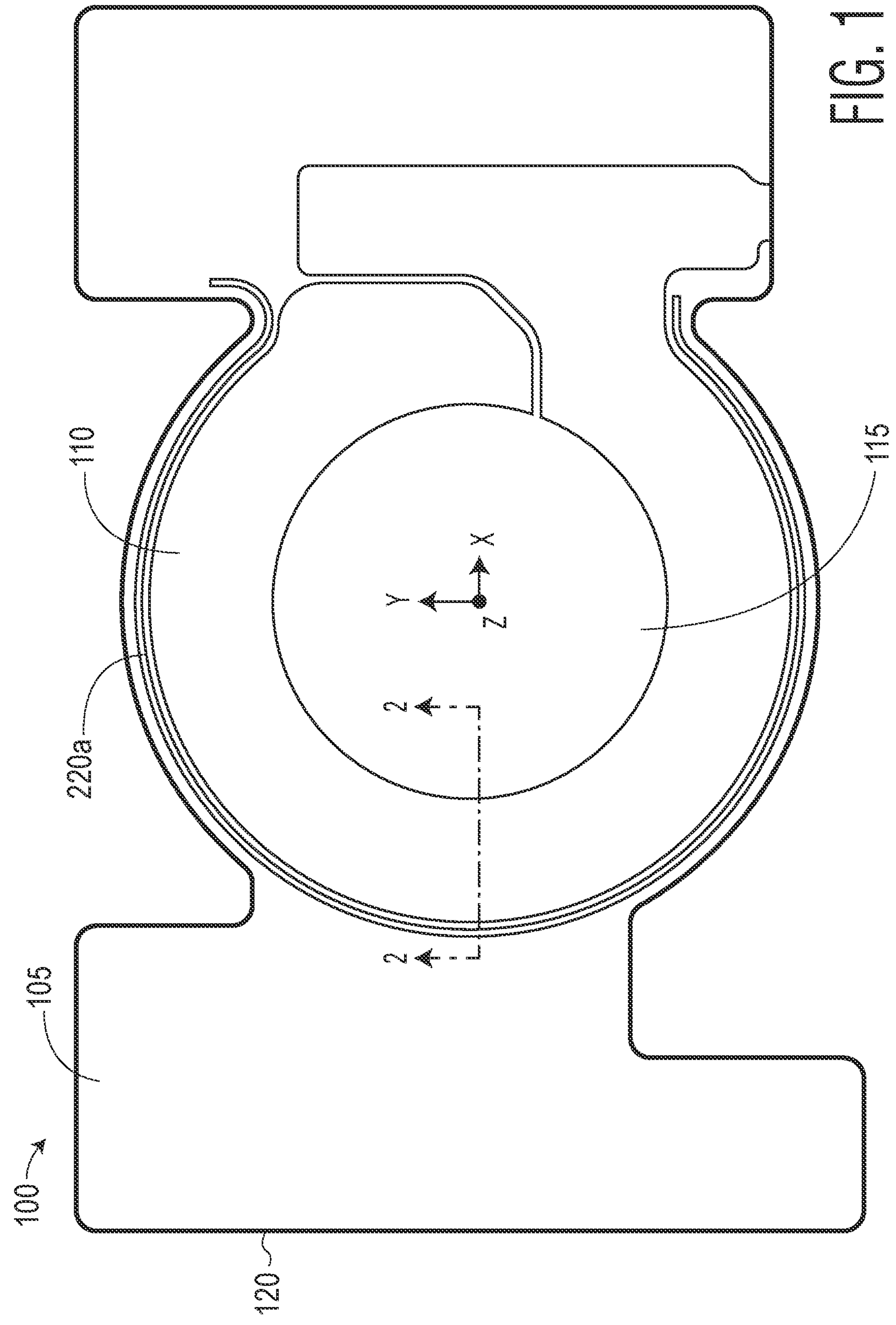
FIG. 1 illustrates a top plan view of a first layer of a PCB that forms a portion of a planar transformer, according to an embodiment of the disclosure.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Techniques disclosed herein relate generally to electronic transformers. More specifically, techniques disclosed herein relate to electronic transformers that include one or more auxiliary windings in addition to primary and secondary windings. Various inventive embodiments are described herein, including methods, processes, systems, devices, and the like.

For example, in some embodiments a transformer is formed from a multilayer PCB that includes windings formed around a magnetic core. The transformer includes a primary winding arranged to receive an input AC voltage which induces a varying magnetic flux in the magnetic core. The varying magnetic flux induces a varying electromotive force across other windings formed around the magnetic core. In this particular example there is a secondary winding formed around the magnetic core that produces an AC output signal for a load where the input signal is electrically isolated from the output signal via the transformer. In addition, by varying the number of turns of the primary and the secondary windings (e.g., turns ratio) the voltage of the output signal can be stepped up or down as compared to the voltage of the input signal. Often one or more shielding windings and/or layers are formed between the primary and secondary windings to minimize the coupling of electrical noise from the primary winding to the secondary winding.

An auxiliary winding is also formed around the magnetic core and is used to produce an auxiliary AC output signal that can be a different voltage than the output signal and is used to supply power to auxiliary circuitry. In further embodiments the auxiliary winding is used to supply power to circuitry associated with the primary side of the transformer where the voltage supplied by the auxiliary winding is different than the voltage of the input signal.

In some embodiments the presence of the auxiliary winding induces a current imbalance (e.g., common mode noise injection) between the primary and secondary windings and/or couples noise from the primary winding to the secondary winding which can result in an unacceptable level of noise on the output signal. To compensate for the imbalance induced by the auxiliary winding a compensation winding can be added on the same layer as one of the shielding windings, where the compensation winding is wound in an opposite direction as compared to the shielding winding which it shares a layer with. In some embodiments a first end of the compensation winding can be electrically floating and a width and a number of turns of the compensation winding can be adjusted to cancel the current imbalance caused by the addition of the auxiliary winding. In further embodiments the compensation winding can be formed on a same layer as the auxiliary winding or on an adjacent layer.

In order to better appreciate the features and aspects of the present disclosure, further context for the disclosure is provided in the following section by discussing one particular implementation of a planar transformer that includes an auxiliary winding according to embodiments of the disclosure. These embodiments are for explanatory purposes only and other embodiments may be employed in other transformers. For example, embodiments of the disclosure can be used with any transformer that includes one or more auxiliary windings that induce imbalance and/or electrical noise in the system. In some instances, embodiments of the disclosure are particularly well suited for use with computing systems because of their need for auxiliary windings and their susceptibility to electrical noise in the system.

FIG. 1 shows a top plan view of a first layer of a PCB that forms a portion of a planar transformer 100, according to an embodiment of the disclosure. As shown in FIG. 1, first layer 105 includes a first secondary winding 110 wound in a clockwise direction around central region 115. More specifically, first secondary winding 110 is a patterned layer of copper that integrally forms a portion of printed circuit board (PCB) 120. In this particular embodiment all of the windings of transformer 100 are formed within a PCB structure, however, this disclosure is not limited to this configuration and other embodiments may include windings formed from one or more conductors that are not integrated within a PCB and are wrapped around a magnetic core. In some embodiments, central region 115 of PCB 120 is removed and a magnetic core (not shown in FIG. 1) is positioned within the central region to couple AC power from the primary winding to the secondary winding. In some embodiments a bobbin-style core is used while in other embodiments a planar core, E-core, I-core, C-core, pot-core, laminated core, toroidal core or other suitable style of magnetic core can be used. Transformer 100 includes a noise cancellation winding (not shown in FIG. 1) that compensates for an auxiliary winding, as described in more detail below.

Figure 2:
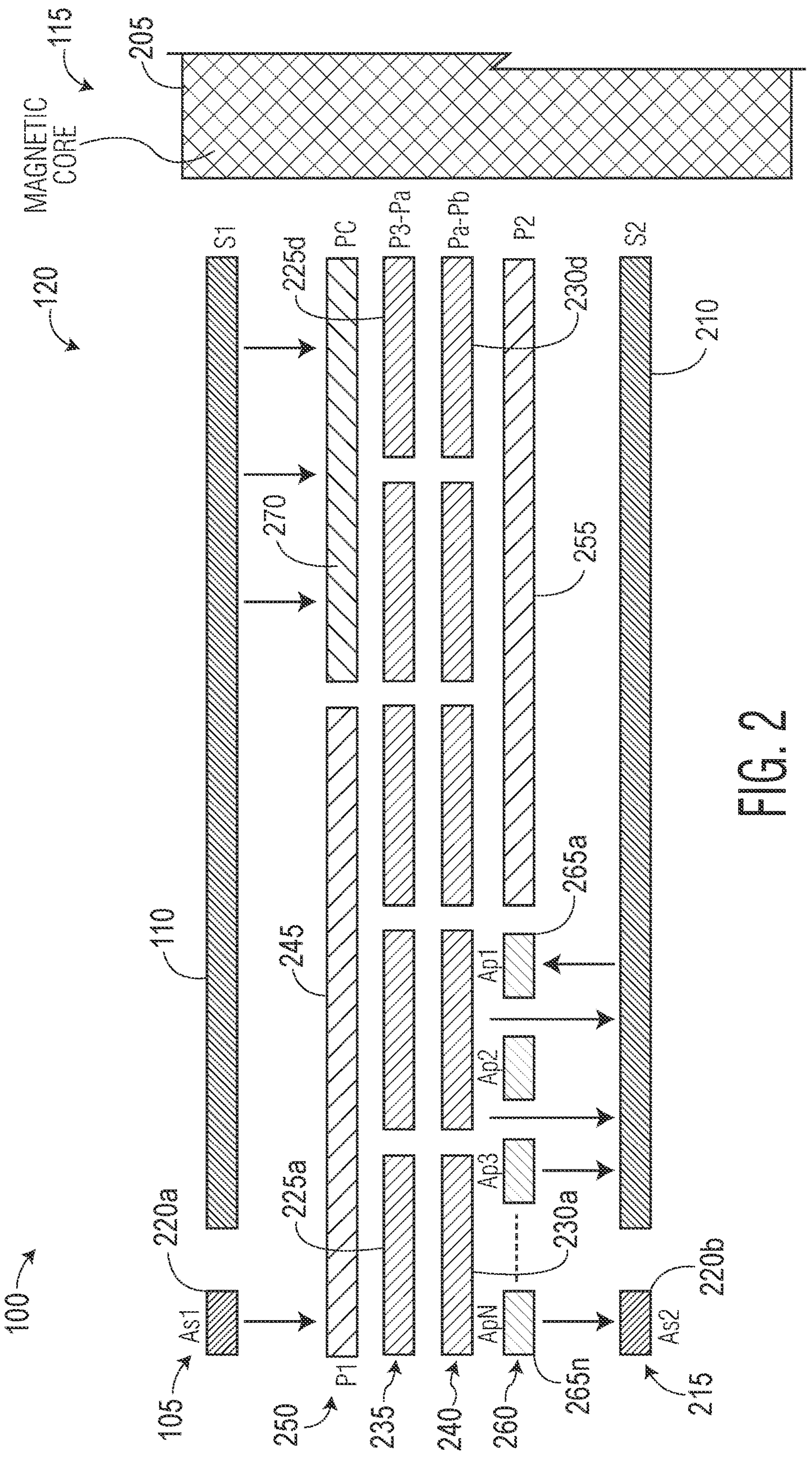
FIG. 2 illustrates a simplified partial cross-sectional view through region 2-2 of the transformer shown in FIG. 1.

FIG. 2 illustrates a simplified partial cross-sectional view through region 2-2 of transformer 100 shown in FIG. 1. As shown in FIG. 2, transformer 100 includes a magnetic core 205 positioned within central region 115 of PCB 120. In this embodiment, PCB 120 includes six separate metal layers each separated by a dielectric layer (not shown), however other embodiments can contain a fewer number or a greater number of layers. More specifically, PCB 120 includes first and second secondary windings 110, 210, respectively, disposed on first layer 105 and sixth layer 215, respectively, of the PCB. In some embodiments one or more secondary auxiliary windings 220*a*, 220*b* can be formed on first and/or sixth layers 105, 215, respectively. Because secondary auxiliary windings 220*a*, 220*b* are positioned on the outer layers (e.g., first layer 105 and sixth layer 215) they may have a negligible effect on current balance within transformer 100 and may not need to be compensated. In this particular embodiment first and second secondary windings, 110, 210, respectively, are each shown as having approximately one turn, however other embodiments may have a fraction of a turn or more than one turn.

Positioned within central region 115 of PCB 120 are first and second primary windings 225*a*. . . 225*d*, 230*a* . . . 230*d*, respectively positioned on third layer 235 and fourth layer 240, respectively. In this particular example each of first and second primary windings 225*a* . . . 225*d*, 230*a* . . . 230*d*, respectively, include approximately four turns as illustrated by the four separate windings shown in each layer, however other embodiments can have fewer or more turns. Positioned between first secondary winding 110 and first primary winding 225*a* . . . 225*d* is a first shield winding 245 formed on second layer 250. Similarly, positioned between second secondary winding 210 and second primary winding 240*a* . . . 240*d* is a second shield winding 255 formed on a fifth layer 260. First and second shield windings 245, 255, respectively, can shield noise from being coupled from first and second primary windings 225*a* . . . 225*d*, 230*a* . . . 230*d*, respectively, to first and second secondary windings 110, 210, respectively.

In this particular embodiment, an auxiliary primary winding 265*a* . . . 265*n* is formed on fifth layer 260, adjacent second shield winding 255 and has n turns (e.g., shown as four turns in FIG. 2). As discussed above, magnetic core 205 can induce a varying electromotive force across auxiliary primary winding 265*a* . . . 265*n* which can supply power to auxiliary circuitry. The number of turns of auxiliary primary winding 265*a* . . . 265*n* can be adjusted to deliver a particular voltage that is suitable for powering the auxiliary circuitry.

In this embodiment, auxiliary primary winding 265*a* . . . 265*n* is positioned on fifth layer 260 between second primary winding 230*a* . . . 230*d* and second secondary winding 210. This location of auxiliary primary winding 265*a* . . . 265*n* not only disrupts the shielding provided by second shield winding 255 (e.g., exposes second secondary winding 210 to the electromagnetic field of second primary winding 230*a* . . . 230*d*), it also causes imbalanced current flow in transformer 100 (e.g., shown by the arrows proximate auxiliary primary winding) resulting in common mode electrical noise in the system. In this particular embodiment the current imbalance is compensated by a compensation winding 270 that is positioned on second layer 250 adjacent first shielding winding 245. Compensation winding 270 is wound in an opposite direction as first shielding winding 245 to balance the current flow within transformer 100. As appreciated by one of ordinary skill in the art having the benefit of this disclosure, a width and a number of turns of compensation winding 270 can be varied to provide a suitable level of current flow to cancel the common mode noise. Each metal layer in transformer 100 can be electrically insulated from adjacent metal layers by one or more dielectric materials including FR4, bismaleimide triazin (BT), polyamide or other suitable electrical insulator.

Figure 3:
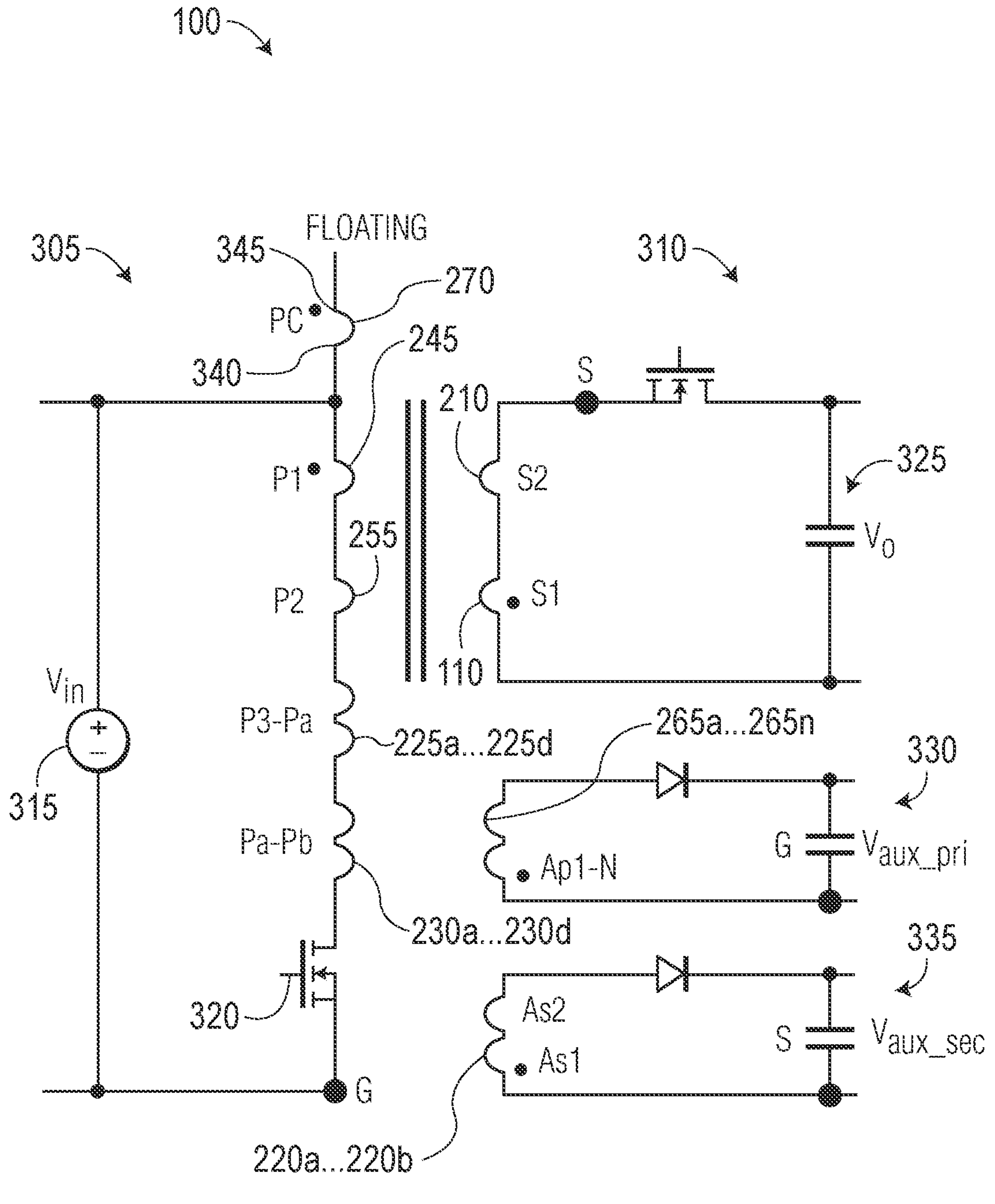
FIG. 3 illustrates a simplified schematic illustration of the windings of the transformer shown in FIGS. 1 and 2.

FIG. 3 shows a simplified schematic illustration of the windings of transformer 100 shown in FIGS. 1 and 2. As shown in FIG. 3 transformer 100 has a primary side 305 electrically isolated from a secondary side 310. Primary side 305 includes first and second primary windings 225*a* . . . 225*d*, 230*a* . . . 230*d*, respectively, coupled in series with an AC power source (shown in FIG. 3 as a DC power source 315 controlled by a switch 320) that induces a varying magnetic flux in magnetic core 205 (see FIG. 2). The varying magnetic flux induces a varying electromotive force across first and second secondary windings 110, 210, respectively which are coupled in series and produce an AC output signal 325 for a load. First and second primary windings 225*a* . . . 225*d*, 230*a* . . . 230*d*, respectively, are shielded from first and second secondary windings 110, 210, respectively, by first and second shield windings 245, 255, respectively.

Transformer 100 also includes primary auxiliary winding 265*a* . . . 265*n* that generates a primary auxiliary output voltage 330, and a secondary auxiliary winding 220*a* . . . 220*b* that produces a secondary output voltage 335. Because primary auxiliary winding 265*a* . . . 265*n* is formed on fifth layer 260 (see FIG. 2), between second primary winding 230*a* . . . 230*d* and second secondary winding 210, it induces a current imbalance in transformer 100 which is compensated by compensation winding 270. Compensation winding 270 is formed on second layer 250, adjacent first shield winding 245 and is wound in an opposite direction as the first shield winding. Compensation winding 270 has a first end 340 coupled to the AC power source and a second, distal end 345 that is electrically floating.

Figure 4:
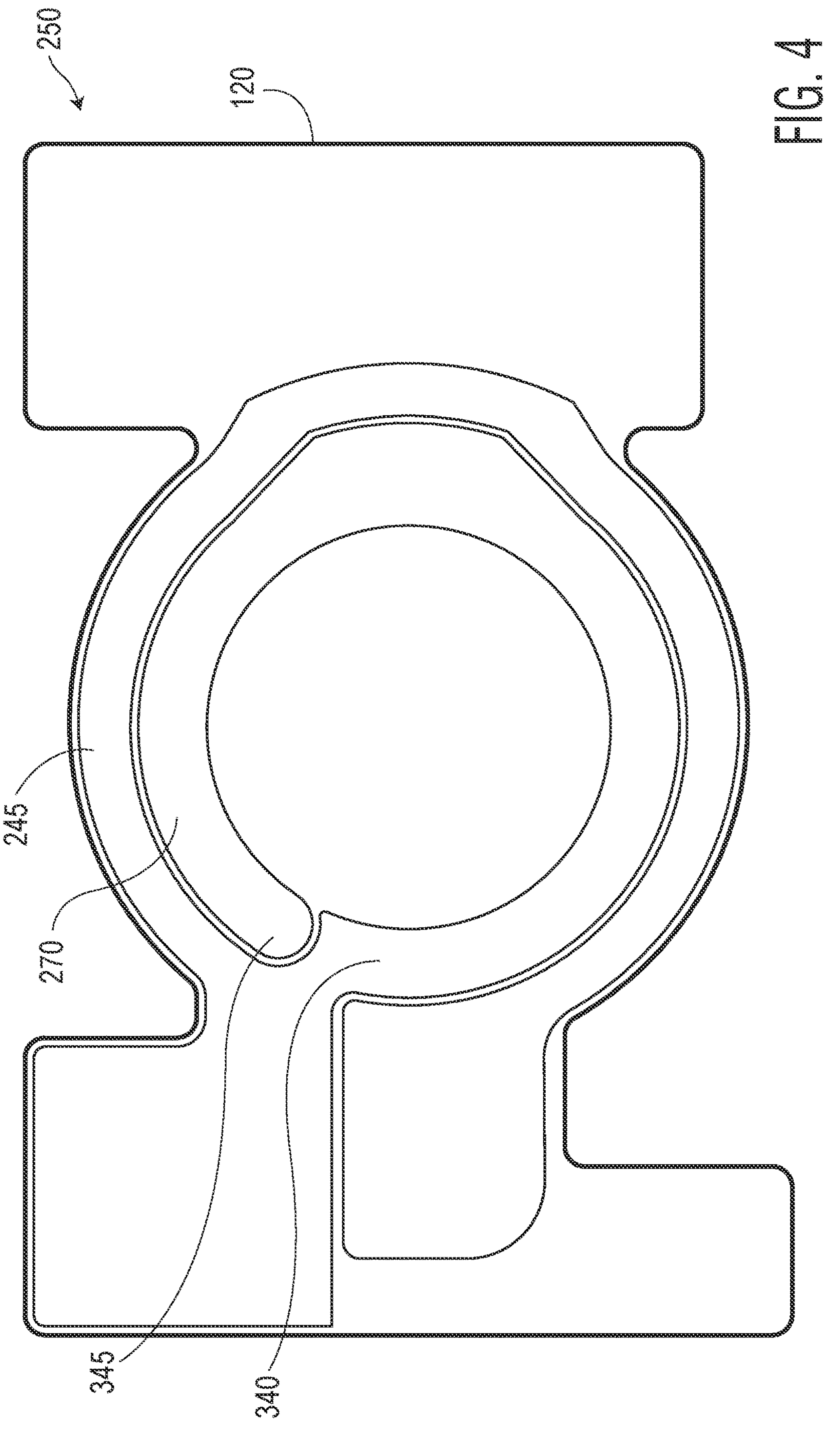
FIG. 4 shows a top plan view of the second layer within the PCB of the transformer shown in FIGS. 1 and 2.

FIG. 4 shows a top plan view of second layer 250 within PCB 120, shown in FIGS. 1 and 2. As shown in FIG. 4, second layer 250 includes first shield winding 245 wound in a clockwise direction, positioned adjacent compensation winding 270 wound in a counterclockwise direction. First end 340 of compensation winding 270 is electrically coupled to first shield winding 245 and second, distal end 345, is electrically floating.

Figure 5:
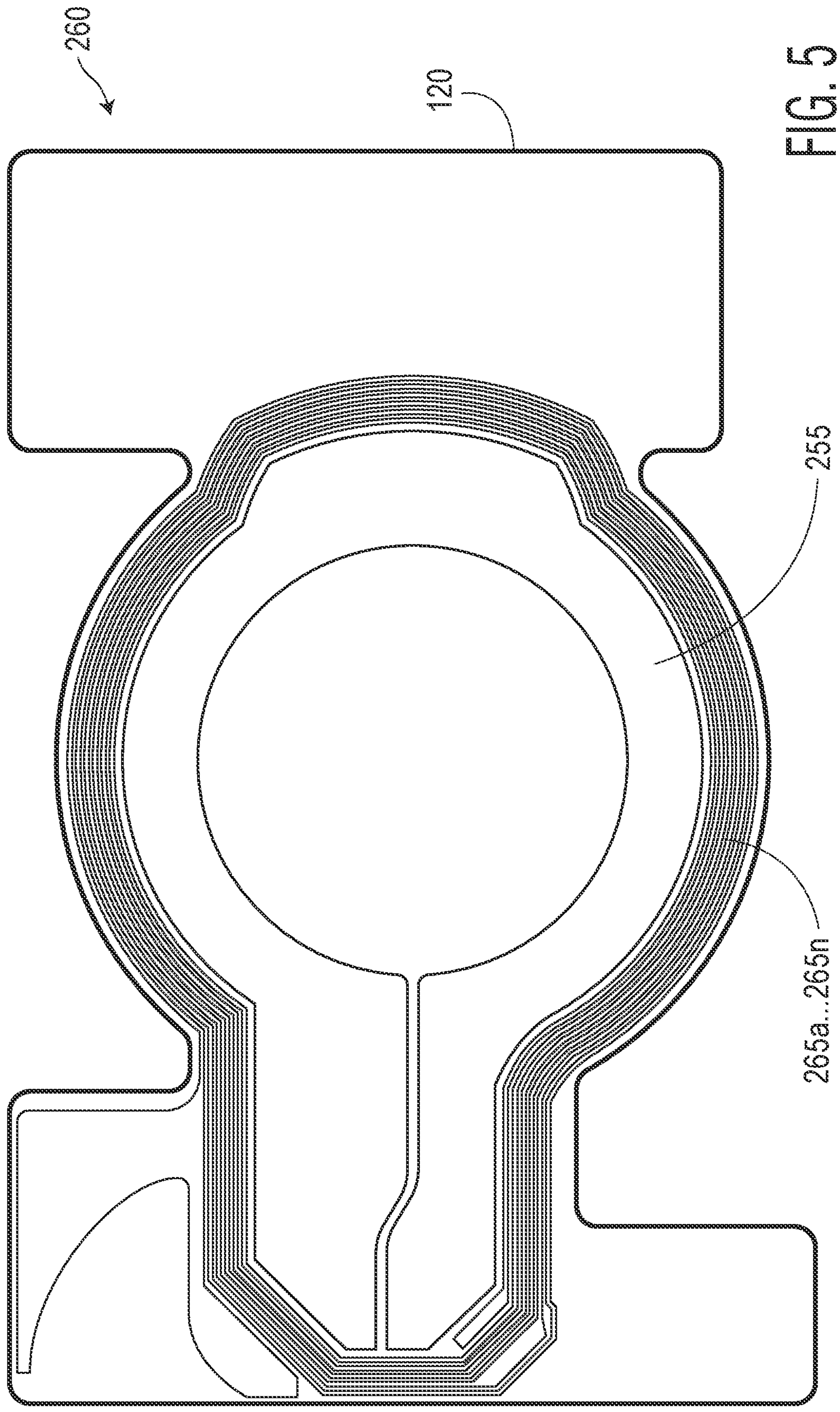
FIG. 5 shows a top plan view of the fifth layer within the PCB of the transformer shown in FIGS. 1 and 2.

FIG. 5 shows a top plan view of fifth layer 260 within PCB 120, shown in FIGS. 1 and 2. As shown in FIG. 5, fifth layer 260 includes second shield winding 255, positioned adjacent primary auxiliary winding 265*a* . . . 265*n*.

Figure 6:
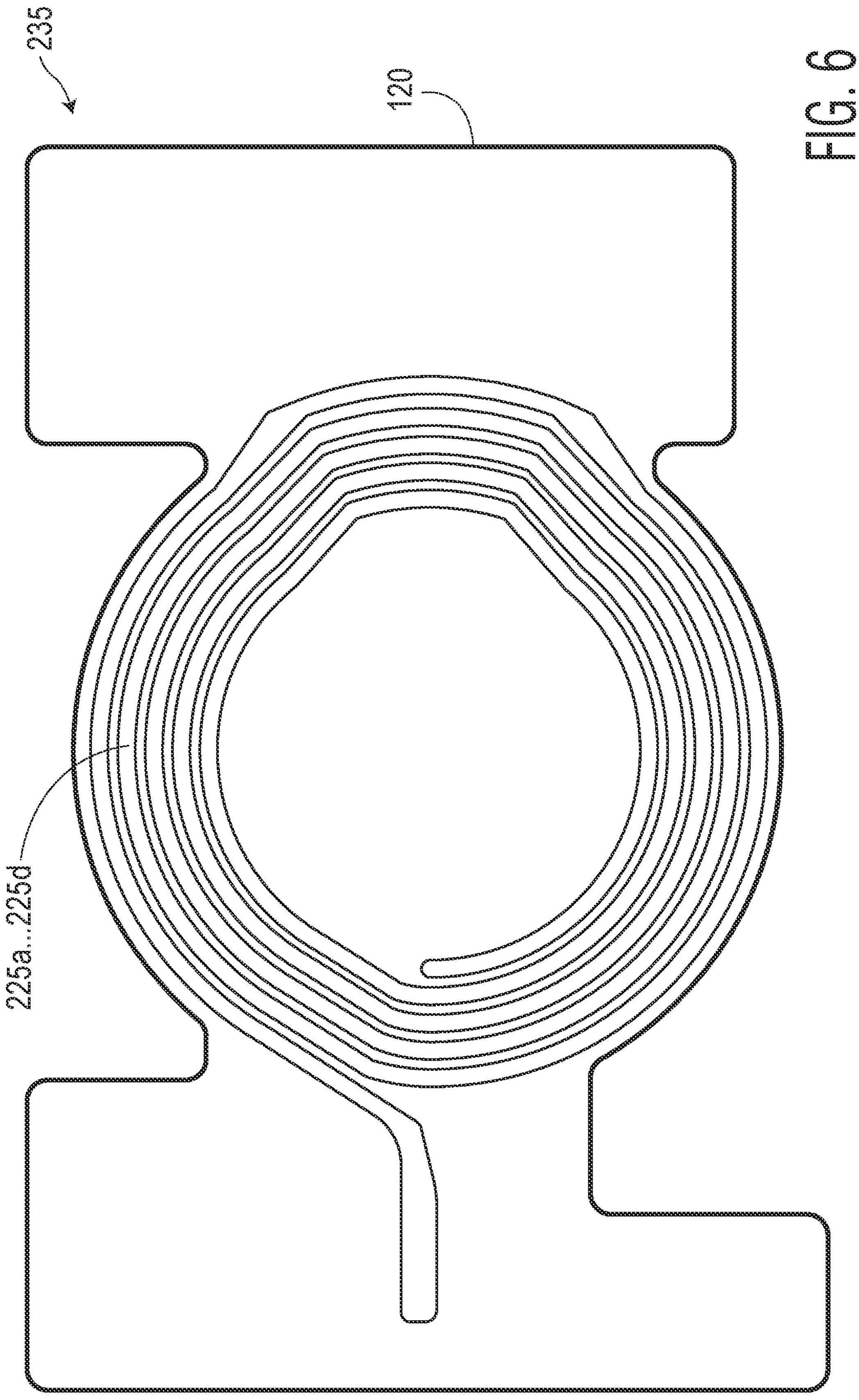
FIG. 6 shows a top plan view of the third layer within the PCB of the transformer shown in FIGS. 1 and 2.

FIG. 6 shows a top plan view of third layer 235 within PCB 120, shown in FIGS. 1 and 2. As shown in FIG. 6, third layer 235 includes first primary winding 225*a* . . . 225*d*.

Figure 7:
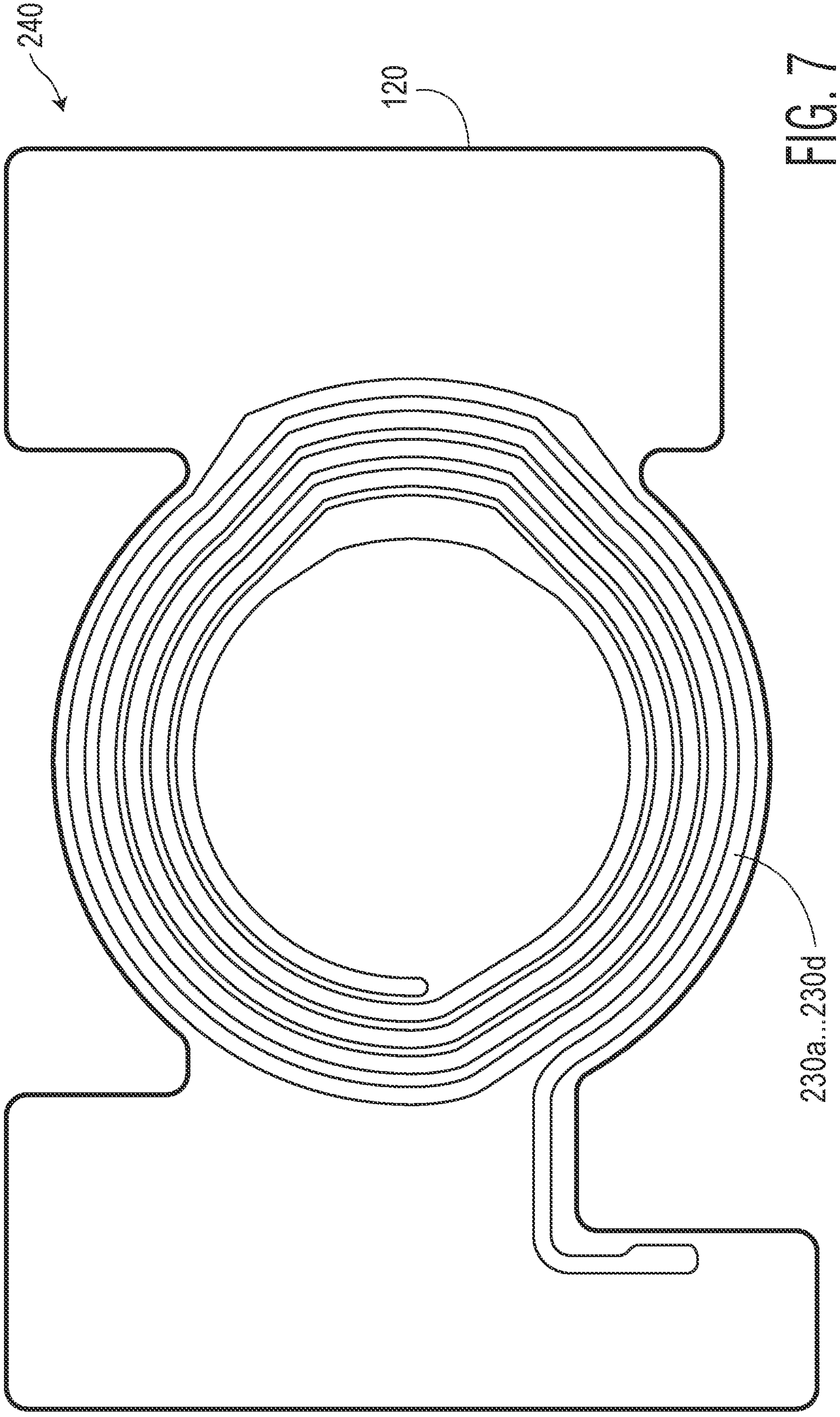
FIG. 7 shows a top plan view of the fourth layer within PCB of the transformer shown in FIGS. 1 and 2.

FIG. 7 shows a top plan view of fourth layer 240 within PCB 120, shown in FIGS. 1 and 2. As shown in FIG. 7, fourth layer 240 includes second primary winding 230*a* . . . 230*d*.

Figure 8:
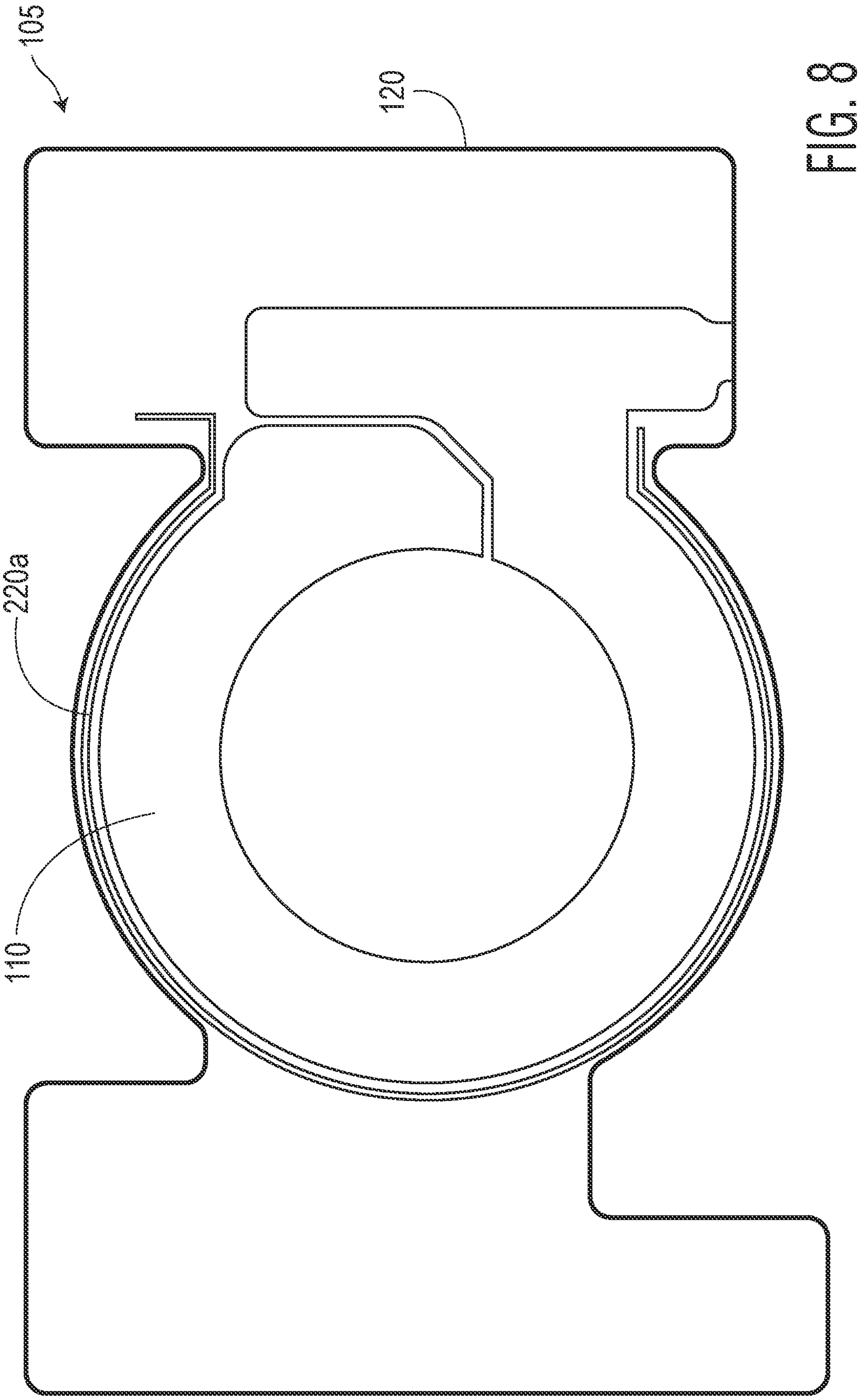
FIG. 8 shows a top plan view of the first layer within PCB of the transformer shown in FIGS. 1 and 2.

FIG. 8 shows a top plan view of first layer 105 within PCB 120, shown in FIGS. 1 and 2. As shown in FIG. 8, first layer 105 includes first secondary winding 110 positioned adjacent a first portion of secondary auxiliary winding 220*a*.

Figure 9:
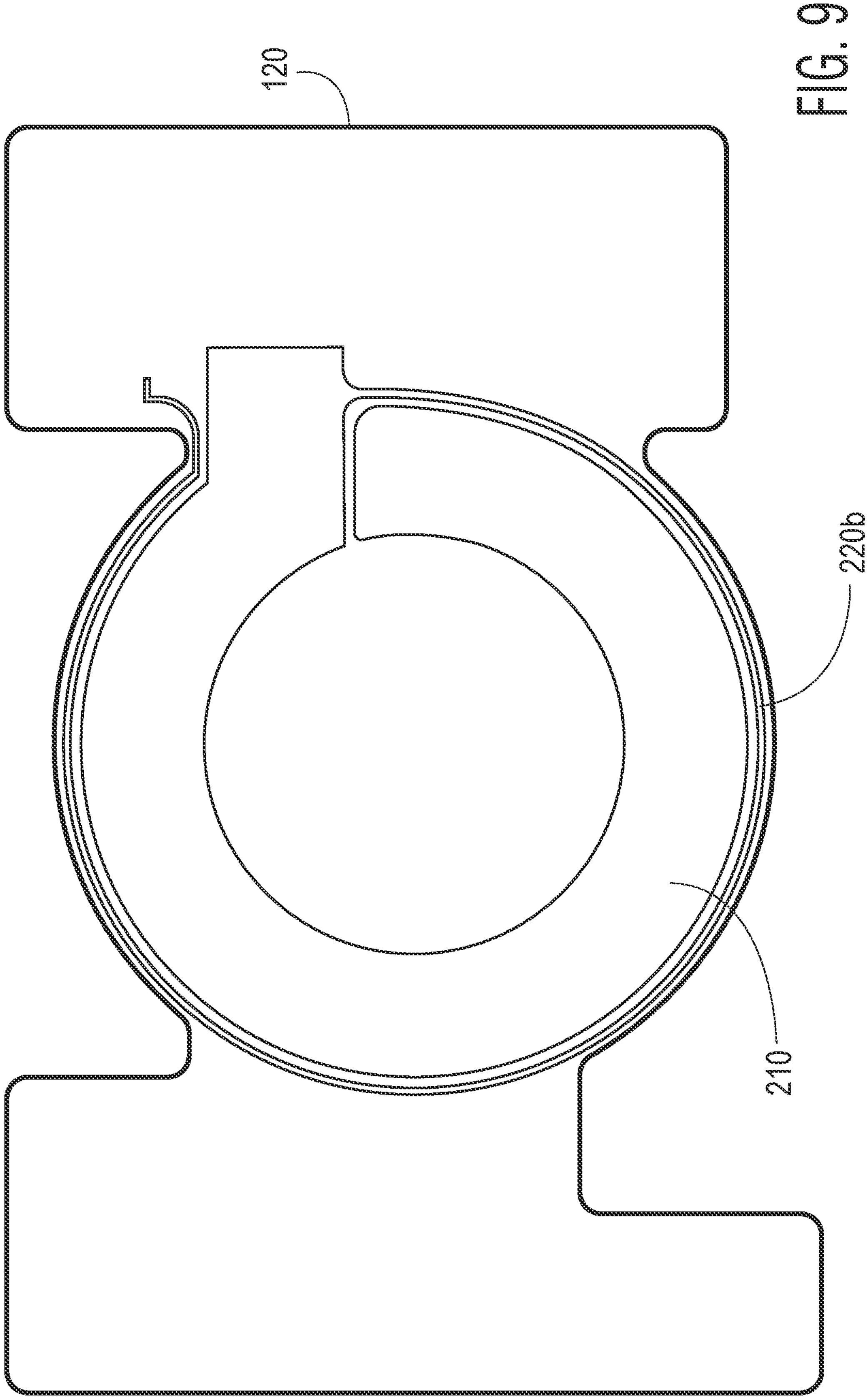
FIG. 9 shows a top plan view of the sixth layer within PCB of the transformer shown in FIGS. 1 and 2.

FIG. 9 shows a top plan view of sixth layer 215 within PCB 120, shown in FIGS. 1 and 2. As shown in FIG. 9, sixth layer 215 includes second secondary winding 210 positioned adjacent a second portion of secondary auxiliary winding 220*b*.

As appreciated by one of skill in the art having the benefit of this disclosure, the metal patterns of the PCB layers described herein are for example only and other embodiments can have different geometries, numbers of turns and/or configurations, some of which are described below. For example, in one embodiment the primary windings may be formed on exterior layers and the secondary windings may be formed on interior layers. As defined herein the term winding can refer to a partial, a full or multiple turns around the magnetic core.

Figure 10:
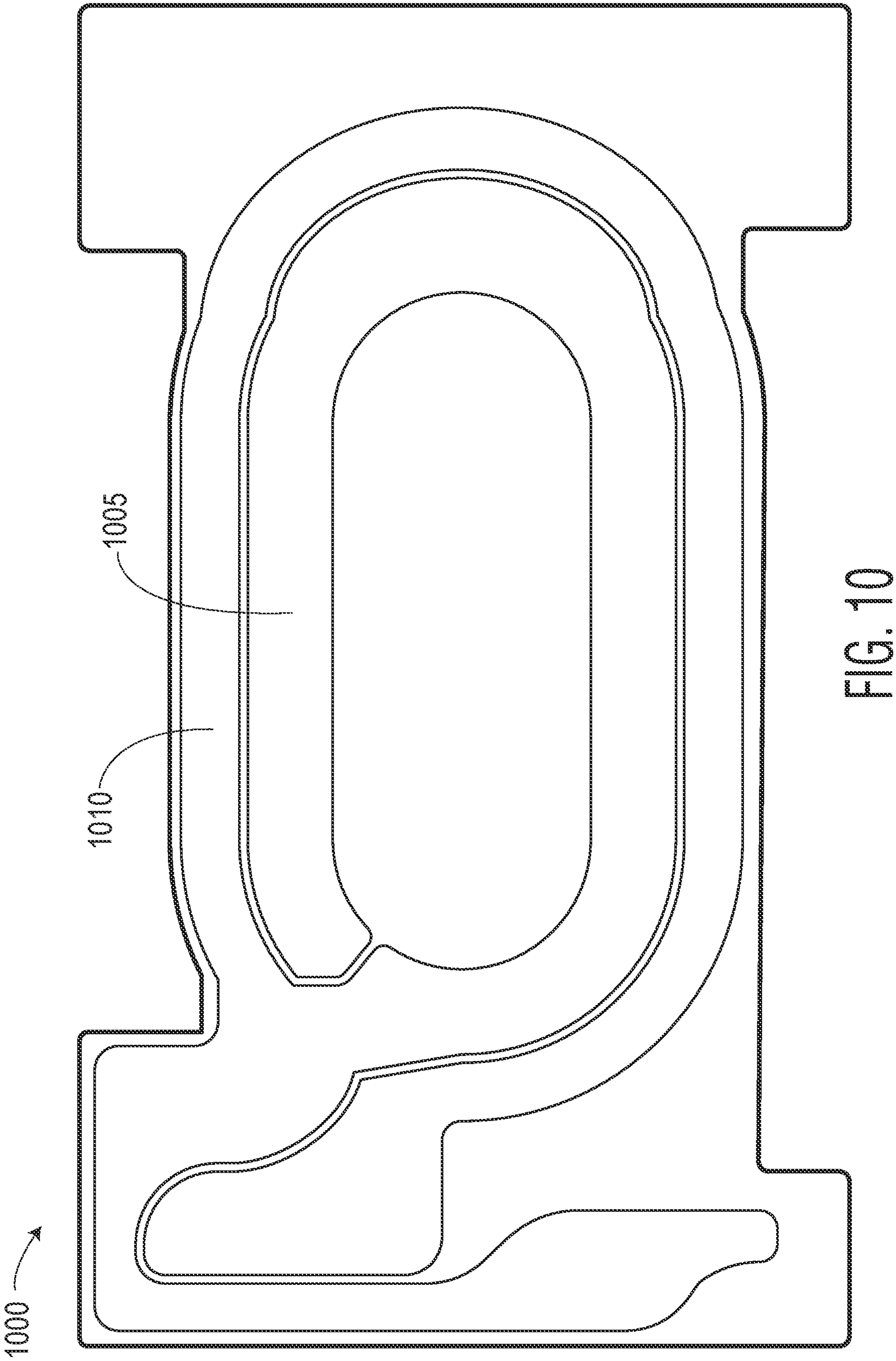
FIG. 10 shows a top plan view of a layer of a PCB-based transformer that includes a compensation winding, according to embodiments of the disclosure.

FIG. 10 shows a top plan view of a layer of a PCB-based transformer 1000 that includes a compensation winding, according to embodiments of the disclosure. As shown in FIG. 10, transformer 1000 is similar to transformer 100 shown in FIGS. 1-9, however transformer 1000 is formed in an oval shape. Compensation winding 1005 is formed on a same layer as shielding winding 1010 where the compensation winding is arranged in a counterclockwise direction and the shielding winding is arranged in a clockwise direction.

Figure 11:
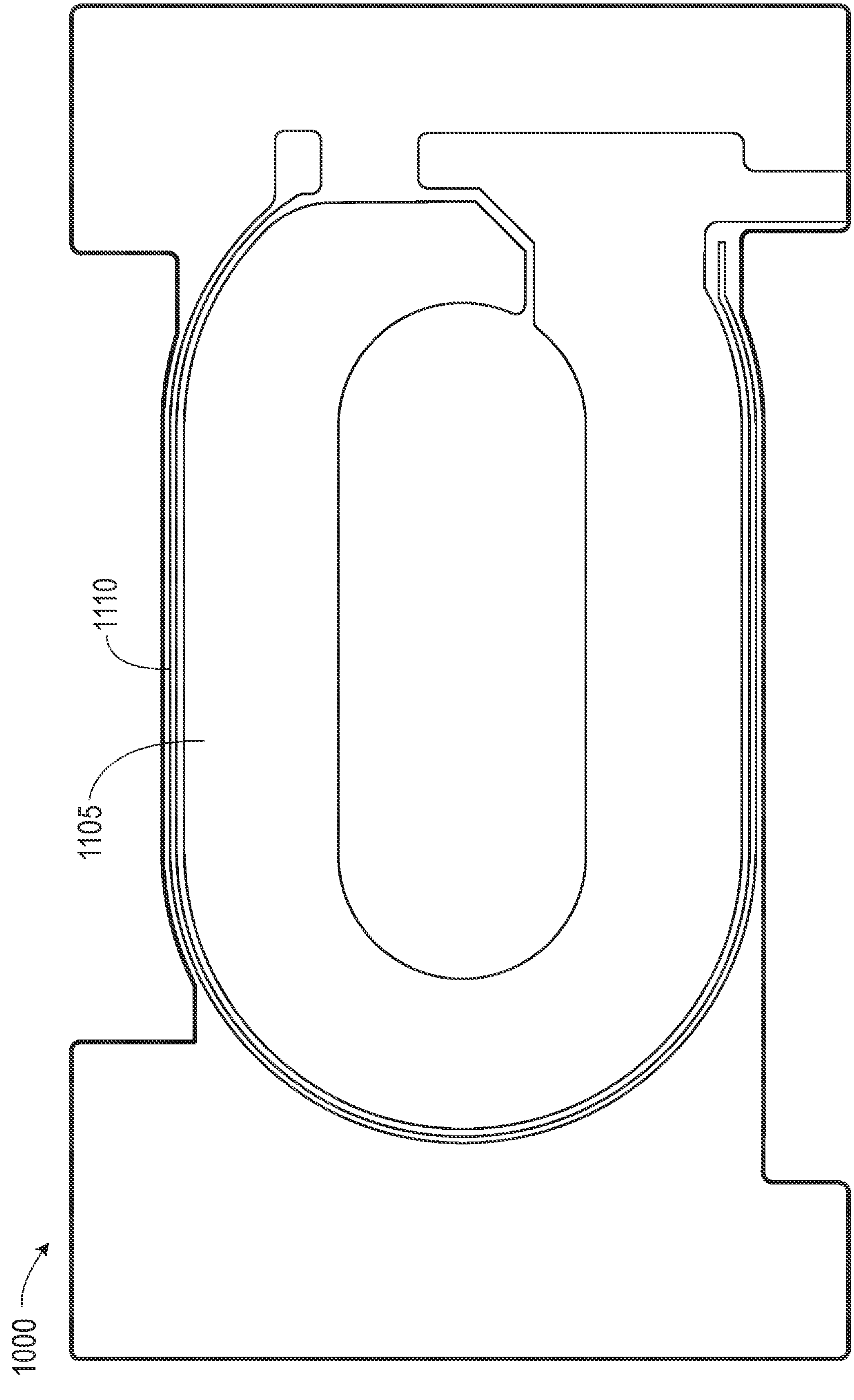
FIG. 11 illustrates a top plan view of another layer of the transformer shown in FIG. 10.

FIG. 11 illustrates a top plan view of another layer of transformer 1000 that includes a first shielding winding 1105 positioned adjacent a secondary auxiliary winding 1110.

Figure 12:
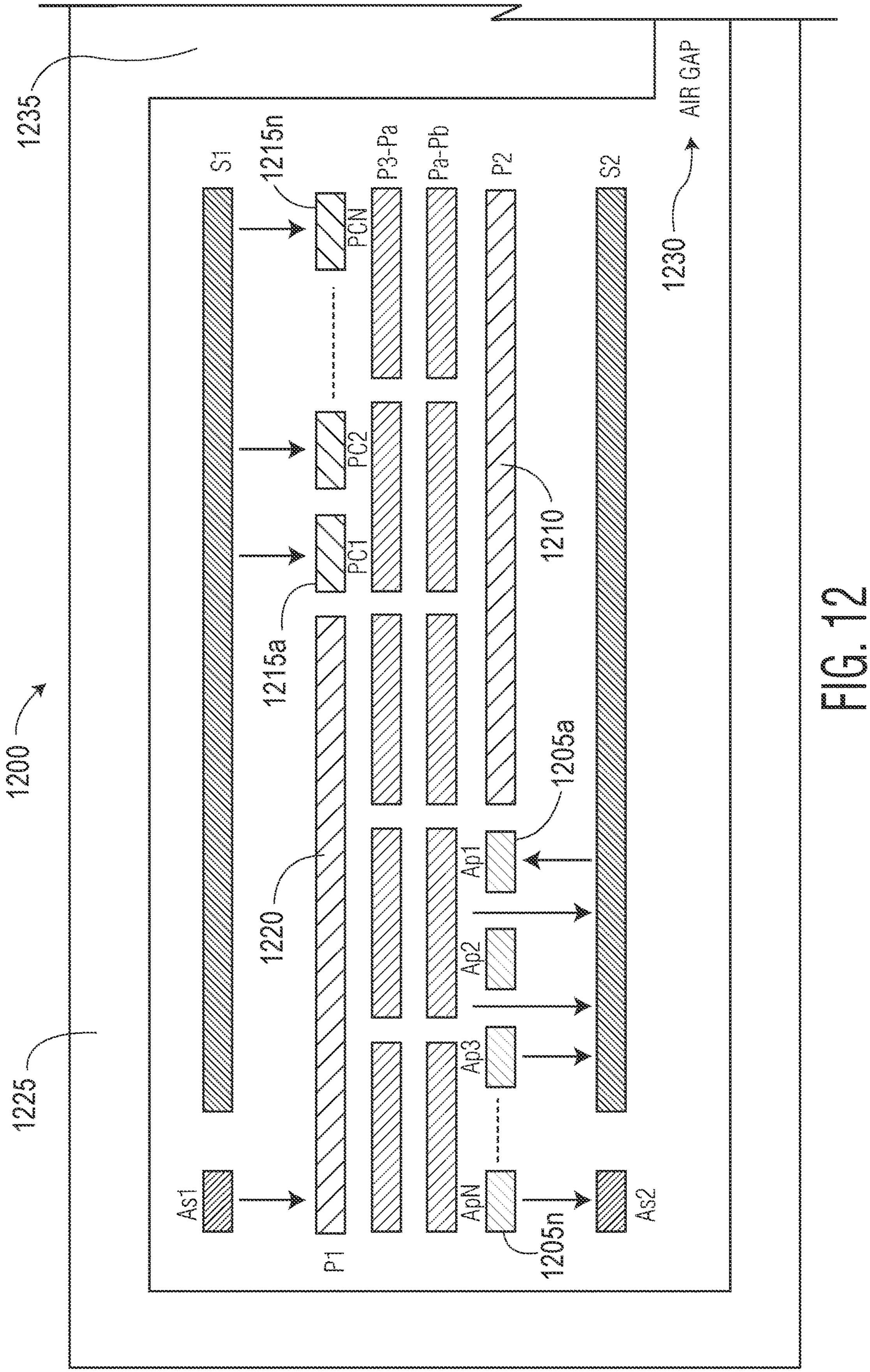
FIG. 12 illustrates a simplified partial cross-sectional view through a region of a PCB-based transformer, according to embodiments of the disclosure.

FIG. 12 illustrates a simplified partial cross-sectional view through a region of a PCB-based transformer 1200 that is similar to transformer 100 shown in FIG. 1. As shown in FIG. 12, transformer 1200 includes a primary auxiliary winding 1205*a* . . . 1205*n* on a same layer as a second shielding winding 1210. Transformer 1200 also includes a compensation winding 1215*a* . . . 1215*n* on a same layer as a first shielding winding 1220, where the compensation winding has n turns. In this embodiment magnet 1225 is illustrated as an E-core configuration having an air gap 1230 at a central portion 1235.

Figure 13:
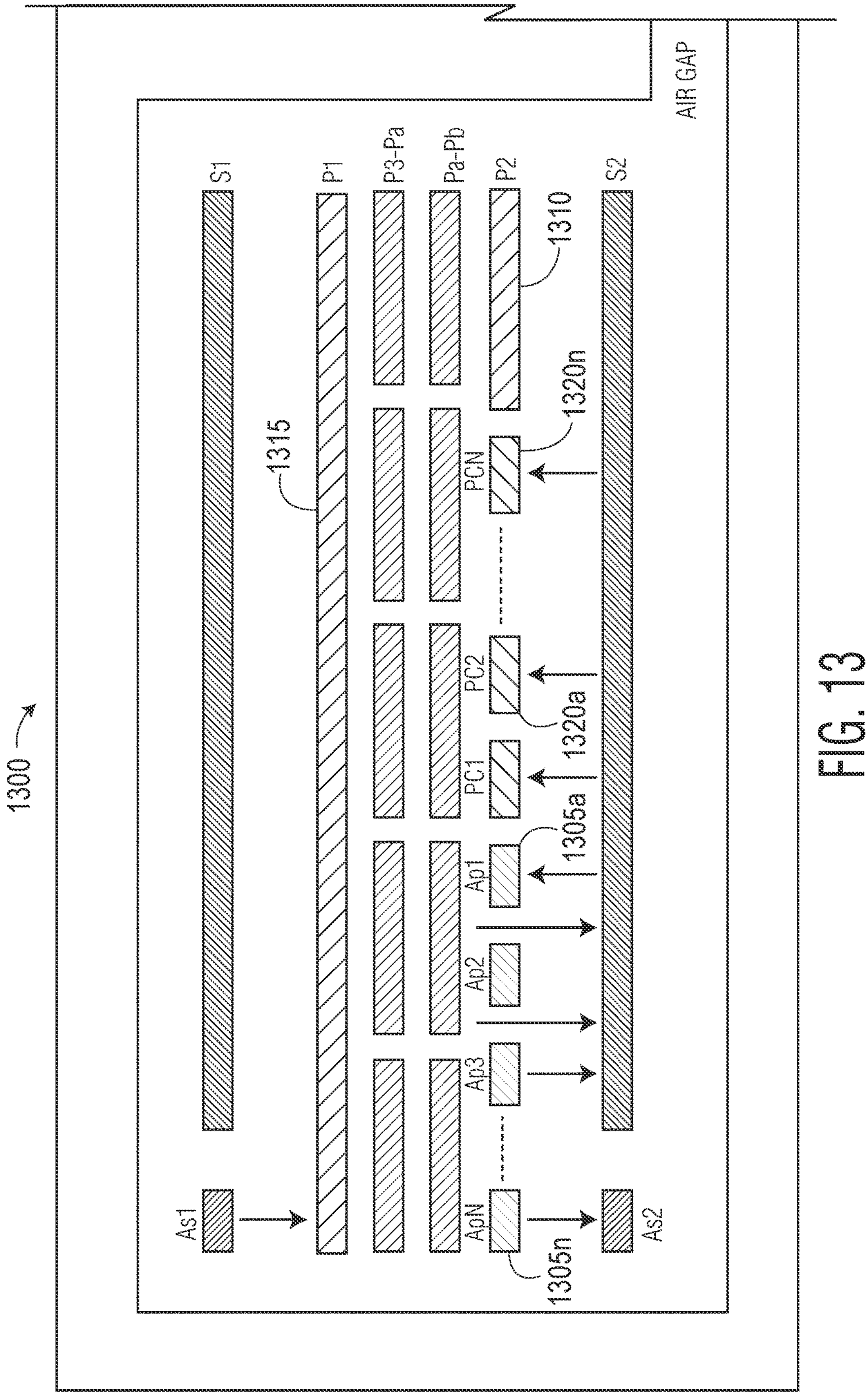
FIG. 13 illustrates a simplified partial cross-sectional view through a region of a PCB-based transformer, according to embodiments of the disclosure.

FIG. 13 illustrates a simplified partial cross-sectional view through a region of a PCB-based transformer 1300 that is similar to transformer 100 shown in FIG. 1. As shown in FIG. 13, transformer 1300 includes a primary auxiliary winding 1305*a* . . . 1305*n* on a same layer as a second shielding winding 1310. However, instead of positioning a compensation winding on the other shielding layer (e.g., a first shielding layer 1315), compensation winding 1320*a* . . . 1320*n* is positioned on the same layer as second shielding winding 1310 and primary auxiliary winding 1305*a* . . . 1305*n*.

Figure 14:
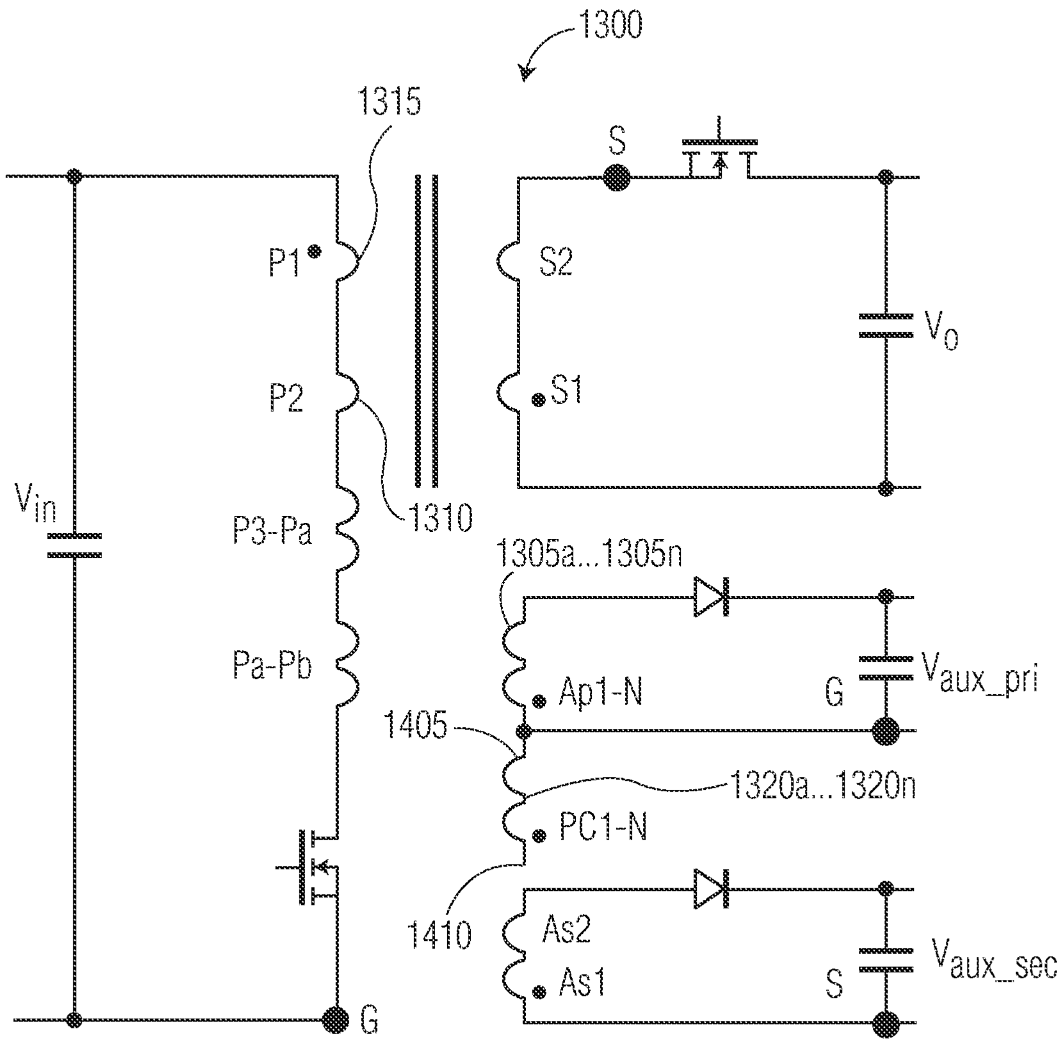
FIG. 14 shows a simplified schematic illustration of the windings of the transformer shown in FIG. 13.

FIG. 14 shows a simplified schematic illustration of the windings of transformer 1300 shown in FIG. 13. As shown in FIG. 14 compensation winding 1320*a* . . . 1320*n* includes a first end 1405 coupled to primary auxiliary winding 1305*a* . . . 1305*n* and a second, distal floating end 1410.

As appreciated by one of skill in the art having the benefit of this disclosure, primary auxiliary winding and compensation winding can be positioned on different layers or the same layer. Variations in placement of compensation winding may result in a number of turns and a width of compensation winding to compensate the current imbalance caused by auxiliary primary winding x. These and other modifications are within the scope of this disclosure.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. An electronic component comprising:

a magnetic core;

first and second primary windings formed around the magnetic core;

first and second secondary windings formed around the magnetic core;

first and second shield windings formed around the magnetic core;

a primary auxiliary winding formed around the magnetic core and positioned on a same layer as the first shield winding; and a secondary auxiliary winding formed around the magnetic core on an outer layer positioned on the same layer as the first secondary winding; and a compensation winding formed around the magnetic core and positioned on a same layer as at least one of the first and the second shield windings;

wherein the compensation winding has a turn count and conductor width specifically selected to provide a compensating current sufficient to at least partially cancel a current imbalance generated by the primary auxiliary winding, and wherein the compensation winding and the shield winding on the same layer are configured with predetermined electrical coupling parameters to achieve the current imbalance cancellation.

2. The electronic component of claim 1 wherein the compensation winding is formed on a same layer as the first shield winding.

3. The electronic component of claim 2 wherein the compensation winding is formed around the magnetic core in an opposite direction as the first shield winding.

4. The electronic component of claim 1 wherein the compensation winding is formed on a same layer as the second shield winding.

5. The electronic component of claim 4 wherein the compensation winding is formed in an opposite direction as the second shield winding.

6. The electronic component of claim 1 wherein a first end of the compensation winding is electrically coupled to the at least one of the first and second shield windings and a second end is electrically floating.

7. A transformer comprising:

a first layer including a first secondary winding;

a second layer including a first shield winding and a compensation winding;

a third layer including a first primary winding;

a fourth layer including a second primary winding;

a fifth layer including a second shield winding and a primary auxiliary winding; and a sixth layer including a second secondary winding; and wherein the first layer further includes a secondary auxiliary winding; and wherein the compensation winding on the second layer has a turn count and conductor width specifically selected to provide a compensating current sufficient to at least partially cancel a current imbalance generated by the primary auxiliary winding on the fifth layer, and wherein the compensation winding and the first shield winding on the second layer are configured with predetermined electrical coupling parameters and predetermined magnetic coupling parameters to achieve cross-layer current imbalance cancellation.

8. The transformer of claim 7 further comprising a magnetic core wherein the first secondary winding, the first shield winding, the compensation winding, the first primary winding, the second primary winding, the second shield winding, the primary auxiliary winding and the second secondary winding are formed at least partially around the magnetic core.

9. The transformer of claim 7 wherein the compensation winding is formed in an opposite direction as compared to the first shield winding.

10. The transformer of claim 7 wherein a first end of the compensation winding is electrically coupled to the first shield winding and a second end is electrically floating.

11. The transformer of claim 7 wherein the primary auxiliary winding induces a current imbalance between the second primary winding and the second secondary winding, and wherein the compensation winding at least partially cancels the current imbalance.

12. A transformer comprising:

a magnetic core;

at least one primary winding formed around the magnetic core;

at least one secondary winding formed around the magnetic core;

at least one shield winding formed around the magnetic core and positioned between the at least one primary winding and the at least one secondary winding;

at least one primary auxiliary power winding formed around the magnetic core and positioned on a same layer as the at least one shield winding;

at least one secondary auxiliary power winding formed around the magnetic core and positioned on a same layer as the at least one secondary winding; and at least one compensation winding formed around the magnetic core and arranged to cancel a current imbalance in the transformer generated by the at least one primary auxiliary power winding;

wherein the at least one compensation winding has a turn count and conductor width specifically selected to provide a compensating current sufficient to at least partially cancel the current imbalance generated by the at least one primary auxiliary power winding, and wherein the at least one compensation winding and the at least one shield winding are configured with predetermined electrical coupling parameters and predetermined magnetic coupling parameters to achieve auxiliary power winding imbalance cancellation.

13. The transformer of claim 12 wherein the at least one compensation winding is formed on a same layer as the at least one shield winding.

14. The transformer of claim 12 wherein the at least one compensation winding is formed around the magnetic core in an opposite direction as compared to the at least one shield winding.

15. The transformer of claim 12 wherein a first end of the compensation winding is electrically coupled to the at least one shield winding and a second end is electrically floating.

16. The transformer of claim 12 wherein the at least one shield winding is a first shield winding and the at least one primary auxiliary power winding is formed on a same layer as the first shield winding, and wherein the transformer includes a second shield winding on a different layer than the first shield winding.

17. The transformer of claim 16 wherein the at least one compensation winding is positioned on a same layer as the second shield winding.

18. The transformer of claim 12 wherein the at least one compensation winding is positioned on a same layer as the at least one shield winding and the at least one primary auxiliary winding.

19. The transformer of claim 12 wherein the primary auxiliary power winding induces a current imbalance between the at least one primary winding and the at least one secondary winding, and wherein the at least one compensation winding at least partially cancels the induced current imbalance.

* * * * *